US012644561B2

(12) United States Patent
Nagata

(10) Patent No.: US 12,644,561 B2
(45) Date of Patent: Jun. 2, 2026

(54) UNIVERSAL HOLDER

(71) Applicant: Randy T. Nagata, Bailey, CO (US)

(72) Inventor: Randy T. Nagata, Bailey, CO (US)

( * ) Notice: Subject to any disclaimer, the term of this patent is extended or adjusted under 35 U.S.C. 154(b) by 0 days.

(21) Appl. No.: 18/759,578

(22) Filed: Jun. 28, 2024

(65) Prior Publication Data

US 2025/0003547 A1     Jan. 2, 2025

Related U.S. Application Data

(60) Provisional application No. 63/510,798, filed on Jun. 28, 2023.

(51) Int. Cl.
| | |
|---|---|
| *F16M 11/20* | (2006.01) |
| *F16M 11/14* | (2006.01) |
| *F16M 11/24* | (2006.01) |
| *F16M 13/02* | (2006.01) |
| *A01K 97/10* | (2006.01) |

(52) U.S. Cl.
CPC ......... *F16M 11/2078* (2013.01); *F16M 11/14* (2013.01); *F16M 11/24* (2013.01); *F16M 13/022* (2013.01); *A01K 97/10* (2013.01); *F16M 2200/022* (2013.01); *F16M 2200/06* (2013.01)

(58) Field of Classification Search
CPC .... F16M 11/2078; F16M 11/14; F16M 11/24; F16M 13/022; F16M 2200/022; F16M 2200/06; A01K 97/10
See application file for complete search history.

(56) References Cited

U.S. PATENT DOCUMENTS

| | | | | |
|---|---|---|---|---|
| 1,800,349 A | * | 4/1931 | Hurason ................. | B25G 3/38 |
| | | | | 403/57 |
| 2,540,584 A | * | 2/1951 | Jaycox ................... | A01K 97/10 |
| | | | | 248/229.15 |
| 2,694,538 A | * | 11/1954 | Consolo ................. | A01K 97/10 |
| | | | | 248/533 |
| 2,950,836 A | * | 8/1960 | Murdock ............ | A24F 19/0092 |
| | | | | 297/188.2 |
| 2,985,414 A | * | 5/1961 | Ince ....................... | A01K 97/10 |
| | | | | D8/71 |
| 3,290,816 A | * | 12/1966 | Eklof ..................... | A01K 97/10 |
| | | | | 403/138 |
| 4,735,388 A | * | 4/1988 | Marks ................... | A61J 9/0638 |
| | | | | 248/103 |
| 5,100,091 A | * | 3/1992 | Pollak ..................... | A61G 5/10 |
| | | | | 248/278.1 |

(Continued)

*Primary Examiner* — Monica E Millner
(74) *Attorney, Agent, or Firm* — Perkins Coie LLP

(57)     ABSTRACT

Embodiments of the present disclosure are directed to a universal holder that comprises at least one receptacle. The receptacle may be configured to receive a variety of items, including a fishing rod, an umbrella, a flashlight, and a beverage cannister, among other items. The at least one receptacle is connected to at least one articulating rod via a ball and socket joint to allow the at least one receptacle to rotate. The at least one articulating rod is also connected to at least one clamp. The clamp may be connected to any structure, such as a chair or railing, and the clamp tension can be adjusted by a threaded rod with a handle. Other attachments may be affixed to the universal holder, such as a cell phone holder or magnetic tackle box via various fastener mechanisms, such as a screw, bolt, magnet, quick-detach clips, snaps, and clips.

20 Claims, 4 Drawing Sheets

(56) References Cited

U.S. PATENT DOCUMENTS

| | | | | |
|---|---|---|---|---|
| 5,163,652 | A * | 11/1992 | King | A01K 97/10 |
| | | | | 248/231.61 |
| 6,220,556 | B1 * | 4/2001 | Sohrt | F16C 11/106 |
| | | | | 403/56 |
| 6,276,651 | B1 * | 8/2001 | Dolan | B25B 5/10 |
| | | | | 411/408 |
| 6,585,400 | B2 * | 7/2003 | Leen | F21V 21/0885 |
| | | | | 362/418 |
| 6,598,837 | B1 * | 7/2003 | Howard | A61J 9/0692 |
| | | | | 248/292.12 |
| 6,601,813 | B1 * | 8/2003 | Kager | F16M 13/00 |
| | | | | 248/314 |
| 7,774,973 | B2 * | 8/2010 | Carnevali | F16M 11/10 |
| | | | | 248/516 |
| 9,038,971 | B1 * | 5/2015 | Guthrie | F16M 11/40 |
| | | | | 361/679.56 |
| 9,206,943 | B2 * | 12/2015 | Chang | A45F 5/00 |
| 11,440,178 | B2 * | 9/2022 | Goto | B25H 1/005 |
| 11,674,635 | B1 * | 6/2023 | White | F16M 11/14 |
| | | | | 248/231.71 |
| 11,796,126 | B2 * | 10/2023 | Chao | F16B 1/00 |
| 12,209,701 | B2 * | 1/2025 | Lo | F16M 11/105 |
| 2004/0188576 | A1 * | 9/2004 | Carnevali | F16M 13/00 |
| | | | | 248/206.5 |
| 2012/0193488 | A1 * | 8/2012 | Chung | F16M 13/00 |
| | | | | 248/201 |
| 2015/0237750 | A1 * | 8/2015 | Yang | F16M 11/041 |
| | | | | 206/45.2 |
| 2015/0305453 | A1 * | 10/2015 | Gatto-Weising | A47G 25/12 |
| | | | | 248/516 |
| 2017/0196212 | A1 * | 7/2017 | Tuck | A01K 97/10 |

* cited by examiner

UNIVERSAL HOLDER

CROSS-REFERENCE TO RELATED APPLICATION(S)

The present application claims priority to U.S. Provisional Application No. 63/510,798, filed Jun. 28, 2023, the contents of which are herein incorporated in its entirety.

TECHNICAL FIELD

The present application is directed to the fields of holding apparatuses, including a cylindrical receptacle to receive a distal end of an object, such as a fishing rod or an umbrella.

BACKGROUND

A wide variety of holding apparatuses exist today, but each of these holding apparatuses are inflexible and cumbersome. For example, many fishermen use a rod holder that is comprised of a receptacle with a spike on one end of the receptacle, and the spike is used to dig into the ground, so the fishing rod can be help in the receptacle, while the receptacle is mounted to the ground. This type of holder does not pivot and cannot be attached to other support structures.

In other examples, holding apparatuses may be permanently attached to other objects, such as chairs, tables, and tent frames. These holding apparatuses are inflexible because they cannot be removed from these structures, but instead must remain affixed to a larger object. If a user desired to remove this holder from the structure, the user would risk damaging the structure to which the holder is permanently affixed.

Another drawback of current holding apparatuses is that they fail to position the receptacle at a desired angle. For instance, many holders have a fixed position, so they cannot rotate or be turned to a certain angle relative to, for example, a body of water where a fishing line will be cast out of a fishing rod or relative to the wind or rain where an umbrella will be placed to protect a user from the elements.

As such, a current need exists for a more flexible and versatile holding apparatus that can receive various items in a receptacle. A need exists to be able to rotate the receptacle in certain positions but also maintain sturdiness or rigidness of the apparatus.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Figure 1:
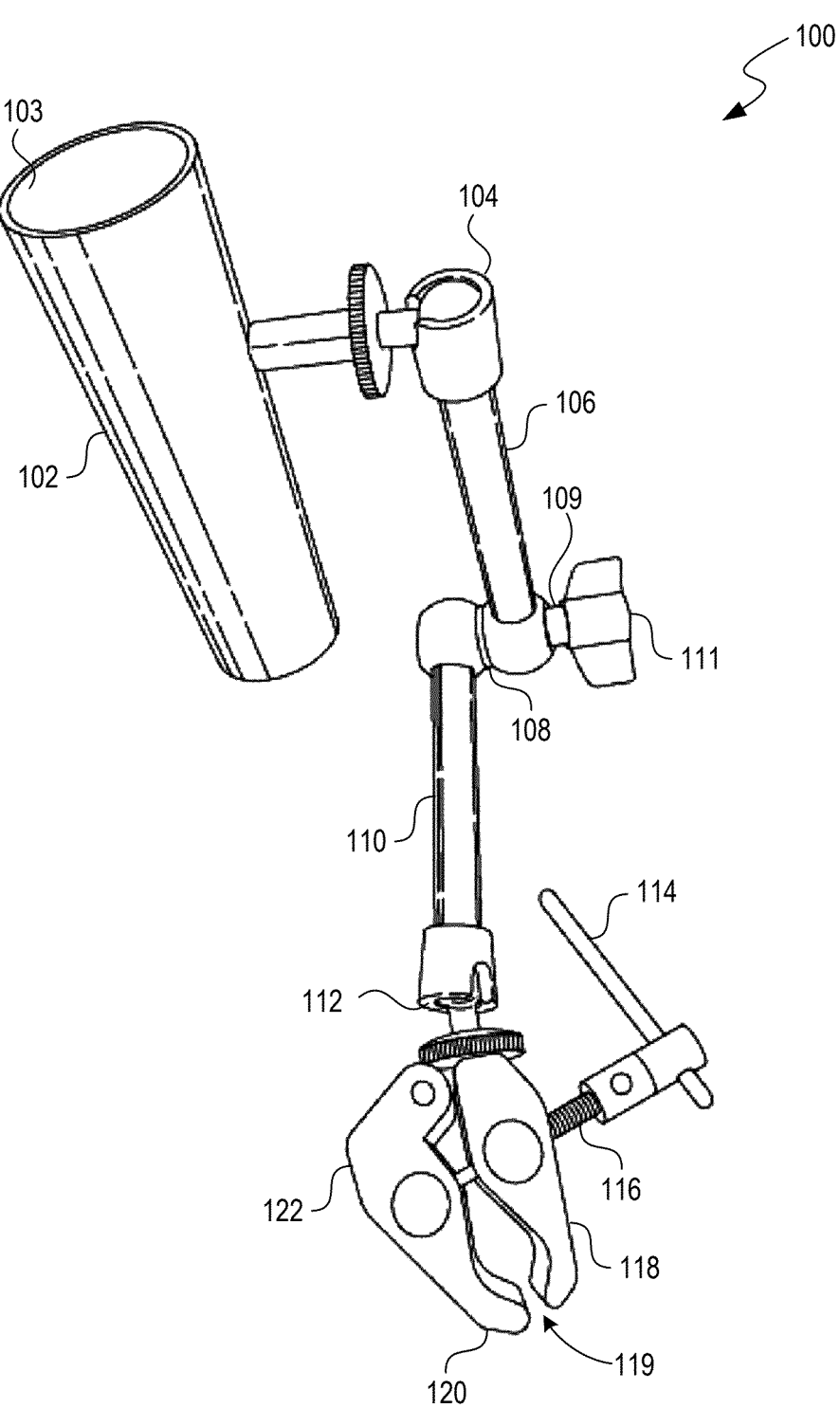
FIG. 1 is a side perspective view which illustrates a particular embodiment of the universal holder.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. The following detailed description is, therefore, not to be taken in a limiting sense.

Embodiments of the present application are directed to a universal holder, specifically to a holding apparatus that comprises a cylindrical receptacle attached to at least one articulating rod (or arm) via a rotating join, such as a ball and socket joint and a threaded screw (or connector). The articulating rod may be connected to a clamp that may be secured to a structure to hold the holder apparatus in place.

The clamp may be connected to the articulating rod with a ball and socket joint and be able to rotate around the axis of the ball and socket joint. The clamp may also comprise at least two notched padded jaws 119 that may be actuated by at least one threaded rod with a handle. The handle may be turned to tighten the clamp jaws together. The jaw components of the clamp may be comprised of a molded synthetic rubber material or a steel material, in some examples. The clamp jaws may comprise receiving points (holes) that provide for a replaceable, non-slip, non-marring surface.

The threaded rod that is affixed to the clamp may be attached to at least one barrel nut that is positioned through receiving points on each padded jaw. The clamp may be configured to attach to certain structures, such as a folding chair frame, a table side, a tent frame, a bucket, a tree branch, a wheelchair, or a tent spike, among other structures.

The clamp may be affixed to at least one articulating rod. In some example aspects, the universal holder may comprise at least two articulating rods, with one rod attached to the clamp portion and the other articulating rod attached to a receptacle. Both rods may be attached a shared joint that is held together via a single threaded connector (bolt or screw) and at least one rosette gear 108 on each articulating arm. The gears may be turned to tighten and loosen the articulating rods so that the receptacle and clamp may be positioned at the desired angles.

The opposing (or distal) ends of each articulating rod may comprise a ball and socket joint. One articulating rod may be connected to a receptacle (such as a cylinder receptacle) via at least one ball and socket joint. The other articulating rod may be connected to the clamp via at least one ball and socket joint. As such, both the receptacle and the clamp may rotate around these axes. Each ball and socket joint may comprise a tightening mechanism, so that the joint may be secured at a certain position in order to prevent the receptacle and/or clamp from moving or rotating.

The receptacle may be comprised of a rigid material, such as stainless steel, aluminum, carbon fiber, PVC pipe, or plastic. The receptacle may be in the shape of a cylinder or tube to receive the distal ends of various cylindrical objects, such as a fishing pole, umbrella, or flashlight.

The receptacle may also be configured to accommodate additional attachments. For example, in some example aspects, the universal holder may comprise a magnetic portion 103, so that an attachment (such as a magnetic bait and tackle box) may be magnetically attached to the universal holder. Other attachments to the universal holder may include a lantern or drink holder. For instance, a lantern with a rotating handle may be affixed to the universal holder via a hook attachment that is connected to the universal holder. The hook attachment may be connected to the body of the cylindrical receptacle or the clamp in some examples. A drink holder attachment may also be connected to the universal holder. For example, a drink holder may comprise at least one attachment point, where the drink holder can be attached to the clamp or the receptacle via a bolt, screw, quick-detach mounts, snaps, buckles, nuts, rivets, buttons, and flush cup mounts, among other fasteners. Each of these fasteners may be utilized by the universal holder to allow other various attachments to connect to the universal holder.

Other attachments may include a cell phone holder or a camera holder. Each of these attachments may be connected to the universal holder via a fastener mechanism as described above. For example, a cell phone holder may be attached to a portion of one of the articulating rods via a ball and socket joint and a threaded connector and handle to tighten and loosen the cell phone holder attachment.

FIG. 1 is a side perspective view which illustrates a particular embodiment of the universal holder. The universal holder 100 comprises a cylindrical receptacle 102. The cylindrical receptacle may be comprised of stainless steel in some examples. The cylindrical receptacle may also be comprised of other materials, such as aluminum, carbon fiber, polyvinyl chloride, or plastic. The cylindrical receptacle 102 is connected to a first articulating rod 106 via at least one rotating ball and socket joint 104 with a threaded end. The ball and socket joint 104 connecting the cylindrical receptacle 102 to the articulating rod 106 allows the cylindrical receptacle 102 to be moved in various positions, up and down and side to side. The ball and socket joint 104 may comprise a tightening mechanism 109 that may be twisted to tighten and loosen the ball and socket joint, so that the cylindrical receptacle 102 can be held in place.

The articulating rod 106 is connected to a second articulating rod 110 via a shared end, with a single threaded handle 111 and two rosette gears 108 on each articulating rod. The single threaded handle 111 allows each articulating rod to move up and down to position the cylindrical receptacle 102 in the proper position. A tightening mechanism 109 may be connected to the single threaded handled 111 that may be tightened or loosened to position the articulating rods 106 and 110 in the proper positions.

At a distal end of the second articulating rod 110 is another ball and socket joint 112 with a tightening mechanism 109. Similar to the first articulating rod 106, this tightening mechanism 109 allows the second articulating rod 110 to be held in position. The ball and socket joint 112 may be connected to a clamp 122. The clamp 122 may have two opposing ends 118 and 120 that can be clamped together and separated apart.

The opposing ends of the clamp 122 may be notched padded jaws 119 actuated by a threaded rod 116 and handle 114. The threaded rod 116 may be connected to at least one barrel nut through each jaw 118 and 120. The clamp may be non-marring and can be attached to any firm structure, sch as a chair, table, tent frame, bucket, tree branch, wheelchair, tent spike, and more. The handle 114 may be turned to tighten and loosen the ends 118 and 120 of the clamp 122.

Figure 2:
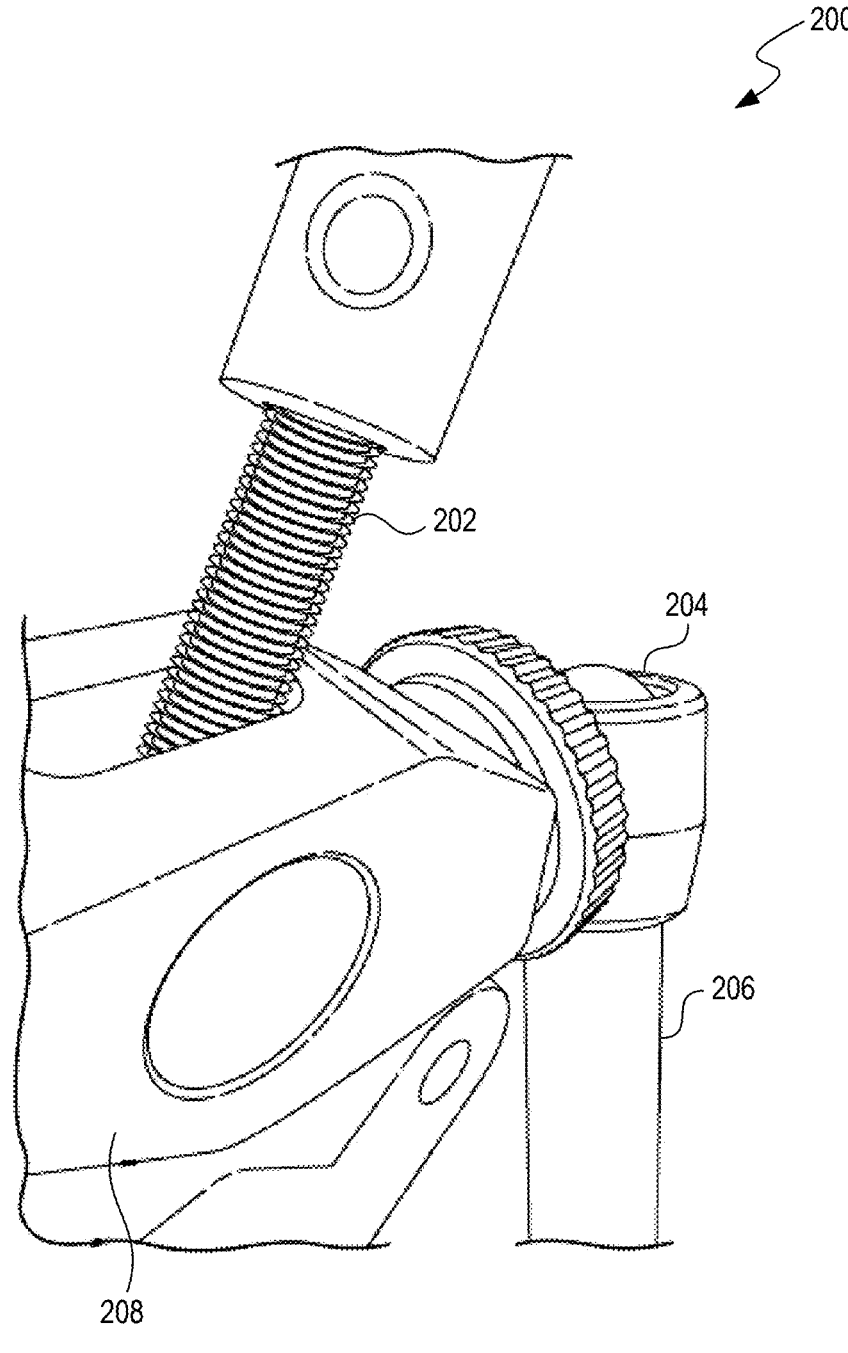
FIG. 2 is a zoomed-in perspective view which illustrates the connection point between one of the articulating rods and the clamp.

FIG. 2 is a zoomed-in perspective view which illustrates the connection point between one of the articulating rods and the clamp. The perspective of the clamp 200 in FIG. 2 shows the threaded rod 202 connected to the handle, which may control the distance between each opposing end 208 of the clamp. The clamp itself is attached to the articulating rod 206 via the ball and socket joint 204. The ball and socket joint 204 allows the clamp to move freely. The ball and socket joint also contains a tightening mechanism that may be hold the clamp in place.

Figure 3:
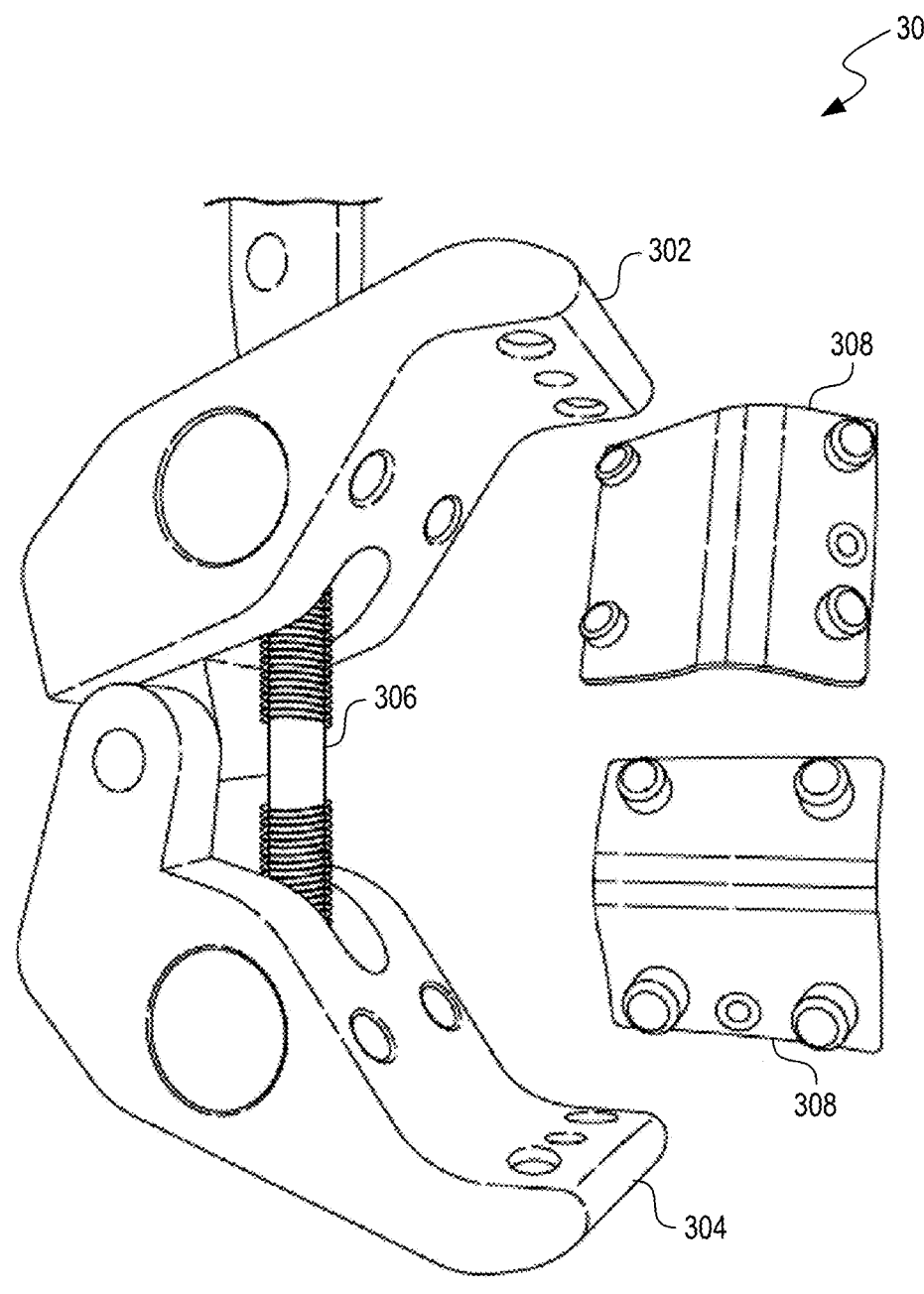
FIG. 3 is a side perspective view which illustrates a clamp connected to the universal holder.

FIG. 3 is a side perspective view which illustrates a clamp connected to the universal holder. The clamp 300 has two opposed ends 302 and 304. Each opposed end may be a padded jaw, where the clamp tightness may be controlled by a single threaded rod 306 that crosses through a portion of each of the clamp ends 302 and 304. The threaded rod 306 may connect to a handle that can be used to tighten or loosen the clamp 300, i.e., control the distance of the clamp ends 302 and 304. Clamp attachments 308 may be comprised of molded synthetic rubber in some examples or stainless steel in other examples. Each receiving point on the clamp attachments 308 may comprise threaded holes to receive a screw or other fastener. The surface of the clamp attachments 308 may be comprised of non-slip and non-marring materials.

Figure 4:
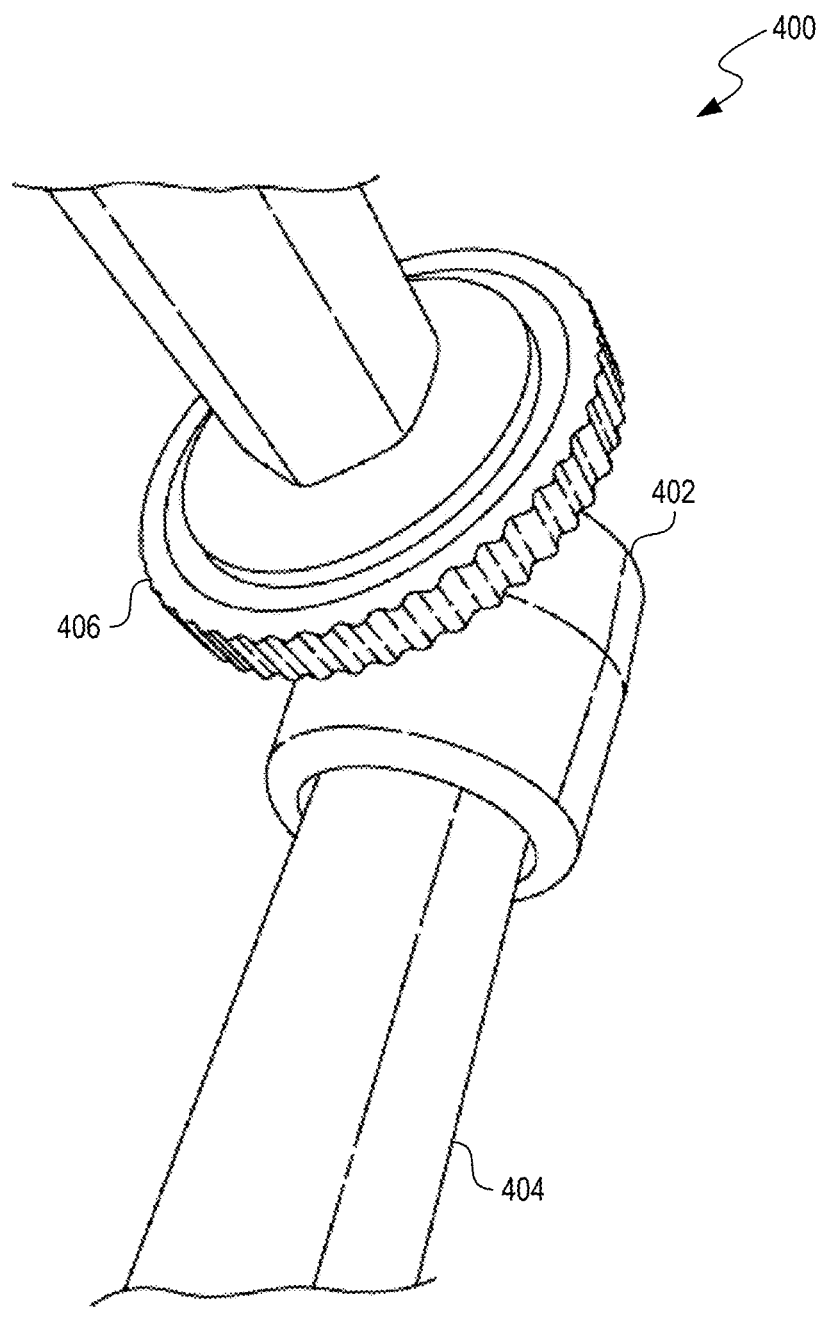
FIG. 4 is a zoomed-in perspective view which illustrates the connection point between one of the articulating rods and the holder.

FIG. 4 is a zoomed-in perspective view which illustrates the connection point between one of the articulating rods and the universal holder 400. The articulating rod 404 connects to a holder, which may be a cylindrical receptacle or some other shaped receptacle, via the ball and socket joint 402 with a tightening gear 406. The ball and socket joint 402 may allow the receptacle to rotate in various directions around the distal end of the articulating rod 404. The tightening mechanism may be used to hold the receptacle in place at the junction between the articulating rod 404 and the receptacle via the ball and socket joint 402.

The universal holder apparatus may have flexibility to rotate the receptacle to a desired angle, as well as rotate the clamp at a desired angle. Variable tension locking mechanisms may be connected to the connection points of the receptacle and the clamp, whereby the locking mechanisms may be tightened and loosened via at least one threaded connector (e.g., screw) and a turning handle.

The articulating rods may be comprised of variable lengths or the same length to accommodate various size and space constraints. For example, if the universal holder was to be attached to a railing, certain railing bars may interfere with the positioning of the clamp and the receptacle. In such an example, one of the articulating rods may need to be shorter than the other articulating rod. Specifically, the articulating rod attached to the clamp may be half the length of the articulating rod that is attached to the cylindrical receptacle.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. An apparatus for holding a fishing rod, comprising:
   a first articulating rod affixed to a side portion of a cylindrical tube receptacle,
   wherein the first articulating rod comprises a first end and a second end,
   wherein the first end of the first articulating rod comprises at least one ball and socket with at least one threaded first connector attached to a side portion of the cylindrical tube receptacle,
   wherein the first articulating rod comprises a tightening gear configured to be twisted to tighten or loosen the cylindrical tube receptacle, wherein the second end of the first articulating rod comprises at least one threaded handle and at least one rosette gear, and wherein the at least one threaded handle comprises a twistable mechanism operatively connected to the tightening gear and configured to be twisted to tighten or loosen the tightening gear the at least one rosette gear, and the at least one ball and socket;

a second articulating rod comprising a first end and a second end, wherein the first end of the second articulating rod is connected to the second end of the first articulating rod by the at least one threaded handle and the at least one rosette gear, wherein the second end of the second articulating rod comprises at least one ball and socket with at least one threaded second connector, and wherein the at least one rosette gear configures the first and second articulating rods to rotate about each other; and a clamp connected to the second end of the second articulating rod by the at least one threaded second connector, wherein the clamp is configured to rotate about the at least one ball and socket of the second end of the second articulating rod, wherein the clamp comprises at least two padded ends, wherein the at least two padded ends face inward towards each other, wherein the clamp comprises at least one threaded rod and at least one handle, and wherein the at least one threaded rod and the at least one handle control a distance between the at least two padded ends.

2. The apparatus for holding a fishing rod of claim 1, wherein the cylindrical tube receptacle is comprised of at least one of: steel, aluminum, carbon fiber, polyvinyl chloride, or plastic.

3. The apparatus for holding a fishing rod of claim 1, wherein the at least one threaded rod and the at least one handle of the clamp control the tension of the clamp.

4. The apparatus for holding a fishing rod of claim 1, wherein the clamp is non-marring.

5. The apparatus for holding a fishing rod of claim 1, wherein the cylindrical tube receptacle is configured to receive a distal end of at least one fishing pole.

6. The apparatus for holding a fishing rod of claim 1, wherein the cylindrical tube receptacle is configured to receive a distal end of at least one flashlight.

7. The apparatus for holding a fishing rod of claim 1, wherein the cylindrical tube receptacle comprises at least one magnetic portion.

8. The apparatus for holding a fishing rod of claim 7, wherein the at least one magnetic portion connects to at least one tackle bowl.

9. The apparatus for holding a fishing rod of claim 1, wherein the cylindrical tube receptacle is configured to receive at least one beverage container.

10. The apparatus for holding a fishing rod of claim 1, wherein the cylindrical tube receptacle is configured to receive a distal end of at least one umbrella.

11. A fishing rod holder, comprising:

a receiving apparatus;

a first articulating rod affixed to a side portion of the receiving apparatus, wherein the first articulating rod comprises a first end and a second end, wherein the first end of the first articulating rod comprises at least one ball and socket with at least one threaded first connector attached to the side portion of the receiving apparatus, wherein the first articulating rod comprises a tightening gear configured to be twisted to tighten or loosen the receiving apparatus, wherein the second end of the first articulating rod comprises at least one threaded handle and at least one rosette gear, and wherein the at least one threaded handle comprises a twistable mechanism operatively connected to the tightening gear and configured to be twisted to tighten or loosen the tightening gear, the at least one rosette gear, and the at least one ball and socket;

a second articulating rod comprising a first end and a second end, wherein the first end of the second articulating rod is connected to the second end of the first articulating rod by the at least one threaded handle and the at least one rosette gear, wherein the second end of the second articulating rod comprises at least one ball and socket with at least one threaded second connector, and wherein the at least one rosette gear configures the first and second articulating rods to rotate about each other; and a clamp connected to the second end of the second articulating rod by the at least one threaded second connector, wherein the clamp is configured to rotate about the at least one ball and socket of the second end of the second articulating rod, wherein the clamp comprises at least two padded ends, wherein the at least two padded ends face inward towards each other, wherein the clamp comprises at least one threaded rod and at least one handle, and wherein the at least one threaded rod and the at least one handle control a distance between the at least two padded ends.

12. The fishing rod holder of claim 11, wherein the receiving apparatus is comprised of at least one of: steel, aluminum, carbon fiber, polyvinyl chloride, or plastic.

13. The fishing rod holder of claim 11, wherein the at least one threaded rod and the at least one handle of the clamp control the tension of the clamp.

14. The fishing rod holder of claim 11, wherein the clamp is non-marring.

15. The fishing rod holder of claim 11, wherein the receiving apparatus is configured to receive a distal end of at least one fishing pole.

16. The fishing rod holder of claim 11, wherein the receiving apparatus is configured to receive a distal end of at least one flashlight.

17. The fishing rod holder of claim 11, wherein the receiving apparatus comprises at least one magnetic portion.

18. The fishing rod holder of claim 11, wherein the at least two padded ends of the clamp comprise molded synthetic rubber.

19. The fishing rod holder of claim 11, wherein the receiving apparatus is configured to receive at least one beverage container.

20. The fishing rod holder of claim 11, wherein the receiving apparatus is configured to receive a distal end of at least one umbrella.

* * * * *